United States Patent
Wong et al.

(10) Patent No.: US 9,155,102 B2
(45) Date of Patent: Oct. 6, 2015

(54) SPEED FRAME EXCHANGE WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Chiu Ngok Eric Wong, San Jose, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 13/930,813

(22) Filed: Jun. 28, 2013

(65) Prior Publication Data

US 2014/0185473 A1    Jul. 3, 2014

Related U.S. Application Data

(60) Provisional application No. 61/747,438, filed on Dec. 31, 2012, provisional application No. 61/828,247, filed on May 29, 2013.

(51) Int. Cl.
*H04L 12/26*   (2006.01)
*H04W 72/12*   (2009.01)
*H04W 74/08*   (2009.01)

(52) U.S. Cl.
CPC ...... *H04W 72/1205* (2013.01); *H04W 74/0808* (2013.01)

(58) Field of Classification Search
None
See application file for complete search history.

(56) References Cited

U.S. PATENT DOCUMENTS

2010/0039263 A1* 2/2010 Chen et al. ............... 340/572.1
2013/0235737 A1* 9/2013 Merlin et al. ............. 370/252

* cited by examiner

*Primary Examiner* — Afshawn Towfighi
(74) *Attorney, Agent, or Firm* — Garlick & Markison; Shayne X. Short

(57) ABSTRACT

A signaling protocol allows for speed frame exchange between different wireless communication devices within single user, multiple user, multiple access, and/or MIMO wireless communication system. A listening wireless communication device analyzes state of speed frame indicator bits within frames transmitted from a first other wireless communication device to determine the entire radio frame exchanges between that first other wireless communication device and a second other wireless communication device. The second other wireless communication device may be a hidden node relative to the listening wireless communication device such that all or less than all transmissions from the hidden node are received by the listening device. The listening wireless communication device determines the status of the communication medium (e.g., the air in the context of a wireless communication system), so that it can transmit successfully without interfering with any ongoing communications between the first and second other wireless communication devices.

20 Claims, 10 Drawing Sheets

SPEED FRAME EXCHANGE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:

1. U.S. Provisional Patent Application Ser. No. 61/747,438, entitled "Speed frame exchange within single user, multiple user, multiple access, and/or MIMO wireless communications," filed Dec. 31, 2012.

2. U.S. Provisional Patent Application Ser. No. 61/828,247, entitled "Speed frame exchange within single user, multiple user, multiple access, and/or MIMO wireless communications," filed May 29, 2013.

DESCRIPTION OF RELATED ART

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-output-single-input (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

A device within such a wireless communication system may able to receive or listen to transmissions from a first device that communicates with a second device yet is unable to receive or listen to transmissions from the second device. Without a clear indication of the status of the communication medium (e.g., air in the context of a wireless communication system), different devices may inadvertently attempt communications at the same time resulting in collisions, lost packets, etc.

DETAILED DESCRIPTION

Figure 1:
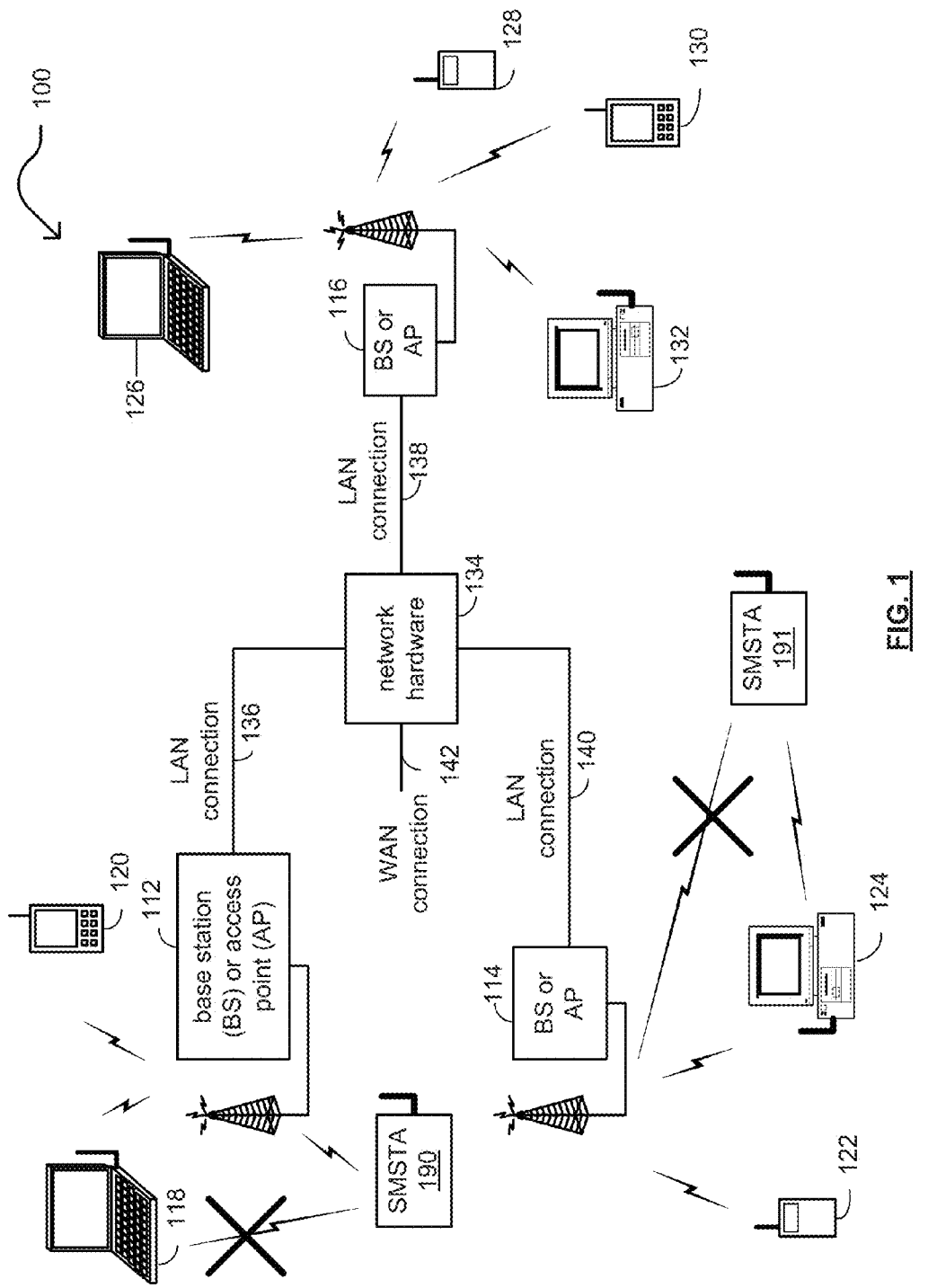
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., devices that include wireless stations (STAs) and/or stand-alone wireless stations), smart meter station (SMSTA) 190 and 191, and a network hardware component 134. The wireless communication devices 118-132 may be laptop computers, or tablets, 118 and 126, personal digital assistant 120 and 130, personal computer 124 and 132 and/or cellular telephone 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-114 to receive services from the communication system 100. For direct connections (i.e., point-to-point communications), wireless communication devices communicate directly via an allocated channel.

Within such a wireless communication system 100, a wireless communication device may be able to detect or listen to one side of a communication between two other wireless communication devices. That is to say, the wireless communication device may be able to listen to receive or listen to transmissions from a first device but not from a second device, which is out of range, or hidden (e.g., a hidden node), from the wireless communication device. The second device may be out of range or hidden for various reasons (e.g., due to distance between the wireless communication device and the second device, an interferer (e.g., building, hill, etc.) blocking the wireless communication device's ability to receive transmissions of the second device, or fading or null spots within a communication system). When a wireless communication device is able to listen to one-side of a communication but not the other side, the wireless communication device determines when the other side of the communication is likely being transmitted based on what it can receive to avoid collisions, packets losses, and/or other adverse effects on the wireless communication system.

Figure 2:
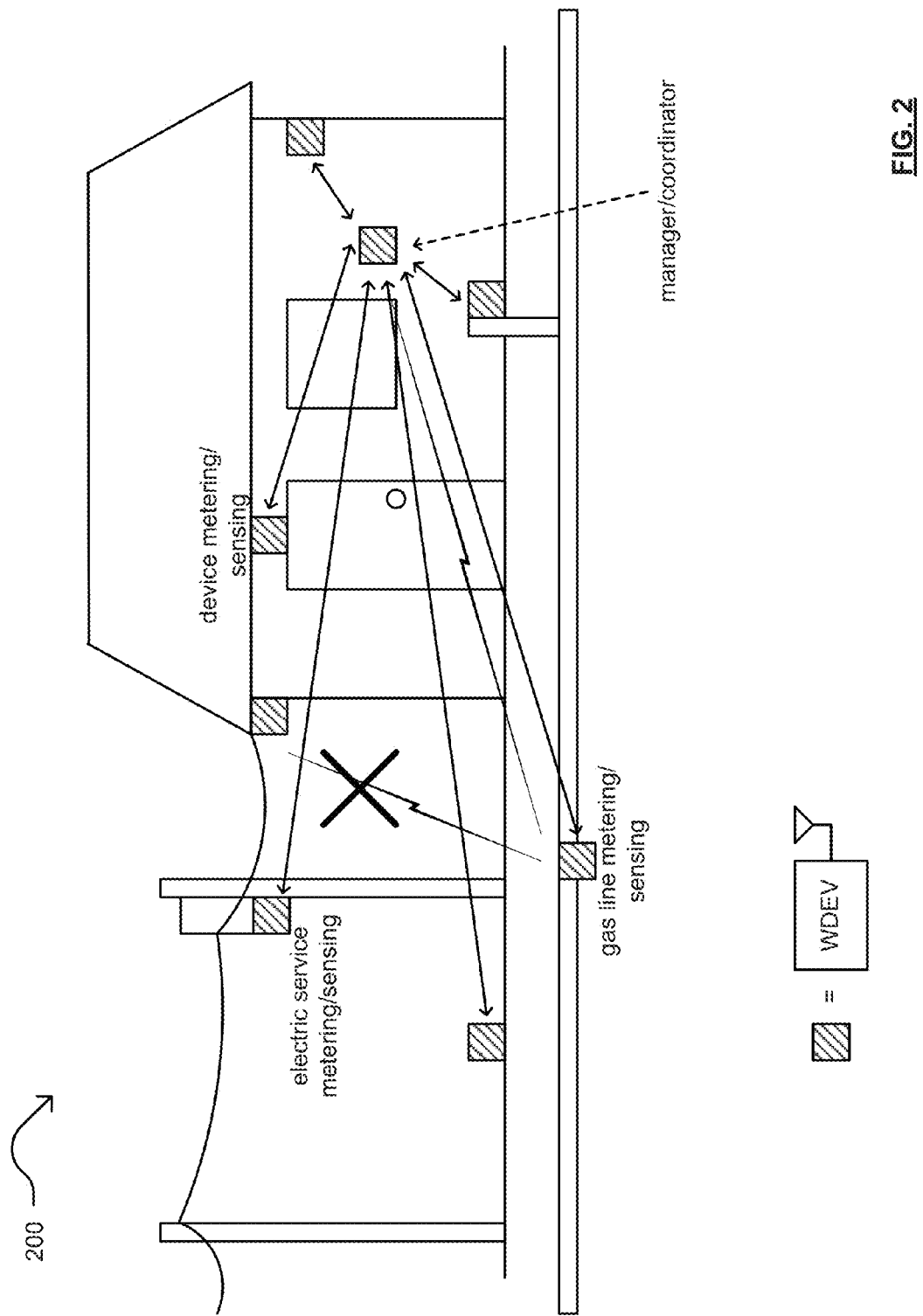
FIG. 2 is a diagram illustrating an embodiment of a number of wireless communication devices, some operative as smart meter stations (SMSTAs).

FIG. 2 is a diagram illustrating an embodiment 200 of a number of wireless communication devices, some operative as smart meter stations (SMSTAs). The SMSTA are implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may transmit such information to another wireless communication device (e.g., an access point (AP), another SMSTA, a wireless station (STA), or such an SMSTA or STA operating as an AP, etc.).

In an SMSTA environment, multiple respective wireless communication devices (e.g., SMSTAs) can be implemented to forward monitoring and/or sensing related information to one particular wireless communication device that operates as a manager, coordinator, etc. such as may be implemented by an access point (AP) or a wireless station (STA) operating as an AP. Such SMSTAs may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes.

Communications from SMSTAs may be very important and yet performed quite infrequently. When communications from SMSTAs are not received by the manager, coordinator, etc. wireless communication device, one or more systems that use such monitoring and/or sensing information suffer performance degradation.

A processor within a given wireless communication device (e.g., a first wireless communication device) is configured to identify frame exchanges between two other wireless communication devices, even when one of them is a hidden node. Even when communications from only one of the other wireless communication devices are received, determination of the frame exchanges between those devices may be inferred based upon state of speed frame indicator bits within those frames which are received. Also, if one or more frames transmitted from the hidden node are somehow detected, that information may also be used to determine the frame exchanges between those devices.

The listening SMSTA determines the frame exchanges between such devices, one of which may be a hidden node, and may then determine the communication medium's status (e.g., knowing that other devices are not currently making transmissions, and the communication medium is available). For example, the state of such speed frame indicator bits may indicate various information including an additional frame to be transmitted, a last frame to be transmitted, a type of frame being transmitted, reservation of the communication medium for some period of time, etc. As mentioned above, the speed frame indicator bits may be partitioned between a packet's physical layer (PHY) header and a media access control (MAC) header. The listening SMSTA analyzes of the speed frame indicator bits's status, including their transition and change among the various frames that are received, and may then appropriately determine the status of the communication medium. The listening SMSTA may transmissions during times in which the communication medium is available and not being used by other wireless communication devices.

Figure 3:
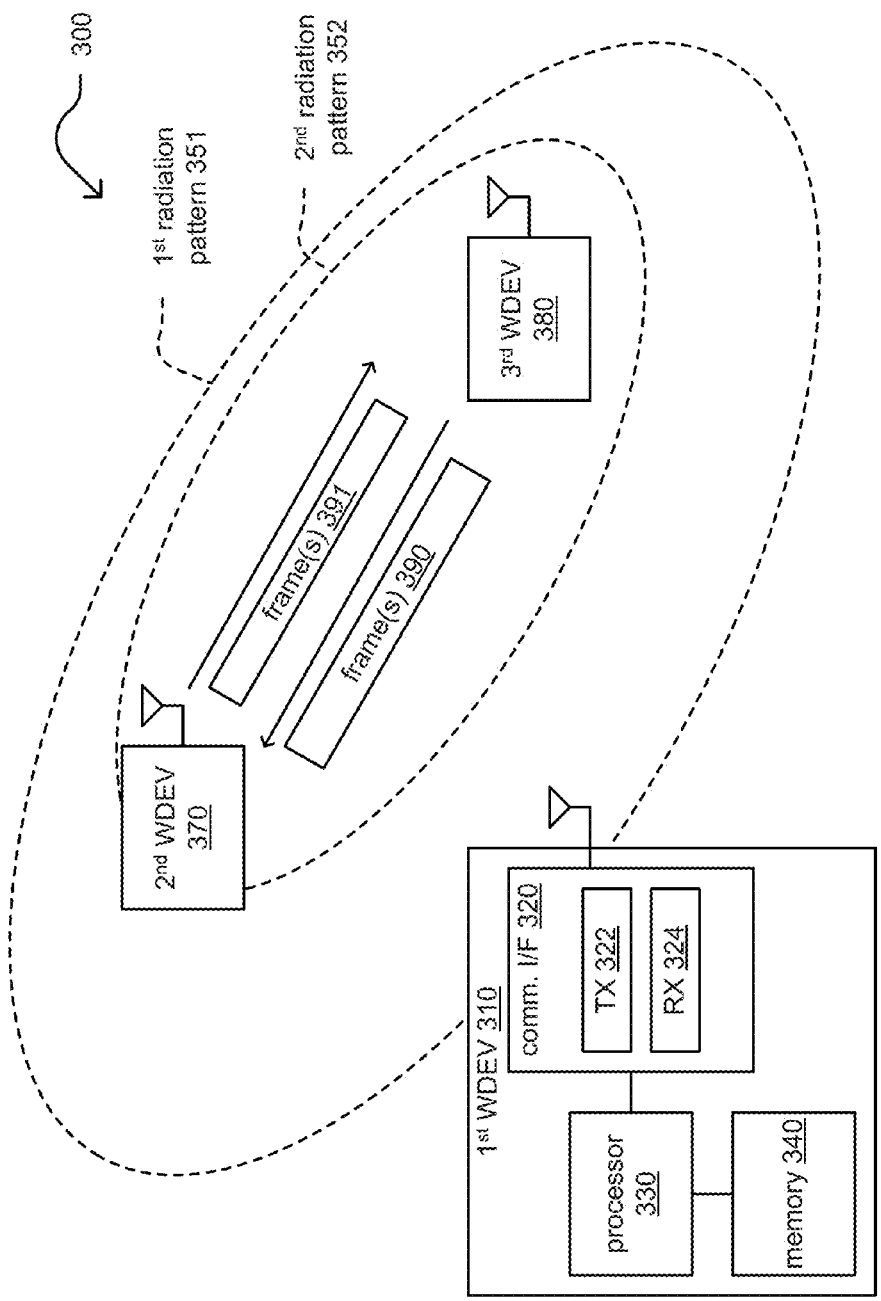
FIG. 3 is a diagram illustrating an example of communication between two wireless communication devices with another wireless communication device being able to receive one side of the communication.

FIG. 3 is a diagram illustrating an example 300 of communication between two wireless communication devices with another wireless communication device being able to receive one side of the communication. The listening wireless communication device able to receive one side of the communication is shown as $1^{st}$ wireless communication device 310 and includes a communication interface 320 to perform transmitting and receiving of one or more frames (e.g., using a transmitter 322 and a receiver 324). The $1^{st}$ wireless communication device 310 also includes a processor 330, and an associated memory 340, to execute various operations including interpreting one or more frames transmitted from at least one of a $2^{nd}$ wireless communication device 370 and a $3^{rd}$ wireless communication device 380. This frame interpretation can include analysis of speed frame indicator bits within the one or more frames.

For instance, assume that the $2^{nd}$ wireless communication device 370 has a first radiation pattern 351 and is in communication with the $3^{rd}$ wireless communication device 380 that has a second radiation pattern 352. The communication may be occurring over one or more communication channels in accordance with one or more wireless communication protocols.

The $1^{st}$ wireless communication device 310 is within the radiation pattern 351 of the $2^{nd}$ wireless communication device 370 but outside of the radiation pattern 352 of the $3^{rd}$ wireless communication device 380. As such, the $1^{st}$ wireless communication device 310 can hear (e.g., receive) transmissions of the $2^{nd}$ wireless communication device 370 but cannot hear (e.g., receive or accurately recover) at least some of the transmissions of the $3^{rd}$ wireless communication device 380. Thus, the $3^{rd}$ wireless communication device 380 is essentially hidden (e.g., a hidden device or node) from the $1^{st}$ wireless communication device 310.

In this situation, to avoid transmission collisions, loss of packets, and/or other adverse effects on the wireless communication system, the $1^{st}$ wireless communication device 310 determines when the $3^{rd}$ wireless communication device 380 is likely transmitting based on the transmissions it can receive from the $2^{nd}$ wireless communication device 370. Note that the $1^{st}$ wireless communication device 310 may receive limited transmissions from the $3^{rd}$ wireless communication device 380 and further use that information to determine when the $3^{rd}$ wireless communication device 380 is likely transmitting.

As a more specific example, the $1^{st}$ wireless communication device 310 interprets frames transmitted by the $2^{nd}$ wireless communication device 370 to determine characteristics of communication between the $2^{nd}$ wireless communication device 370 and the $3^{rd}$ wireless communication device 380 (e.g., frame(s) 391 from the $2^{nd}$ wireless communication device 370 and/or frame(s) 390 from the $3^{rd}$ wireless communication device). The $1^{st}$ wireless communication device 310 then determines when the $3^{rd}$ wireless communication device 380 is likely transmitting based on the characteristics of communication. For example, the $1^{st}$ wireless communication device 310 interprets speed frame indicator bits contained within one or more of the received frames (e.g., frame(s) 390) to determine when the $3^{rd}$ wireless communication device 380 will likely be transmitting. The $1^{st}$ wireless communication device 310 then determines that the one or more communication channels are unavailable when the $2^{nd}$ wireless communication device is likely transmitting (e.g., such as when transmitting the frame(s) 391).

As another example, communication of frames (e.g., frame(s) 390 and/or the frame(s) 391) between the $2^{nd}$ wireless communication device 370 and the $3^{rd}$ wireless communication device 380 are based on a protocol that sets state of speed frame indicator bits within those frames. The $1^{st}$ wireless communication device 310 (e.g., listening device) analyzes the state of the speed frame indicator bits to determine frame exchanges between the $2^{nd}$ wireless communication device 370 and the $3^{rd}$ wireless communication device 380. Note that the speed frame indicator bits may be included within any number of types of frames communicated between devices. The state of such speed frame indicator bits may indicate various characteristics of the communication between the devices including an additional frame to be transmitted, a last frame to be transmitted, a type of frame being transmitted, reservation of the communication medium for some period of time, etc. For example, characteristics of the communication between the $2^{nd}$ wireless communication device 370 and the $3^{rd}$ wireless communication device 380 may be a single frame exchange, symmetrical or asymmetrical multiple frame exchanges, frame length of the a frame transmitted by one of these wireless communication devices, channel allocation of the communication channel between the devices, transmit power of one or both of the wireless communication devices, etc. Further note that the speed frame indicator bits may be partitioned between a packet's physical layer (PHY) header and a media access control (MAC) header.

Even when transmissions are received from only one of the $2^{nd}$ wireless communication device 370 or the $3^{rd}$ wireless communication device 380, the $1^{st}$ wireless communication device 310 (e.g., listening device) may fill in missing frame exchanges between the $2^{nd}$ wireless communication device 370 or the $3^{rd}$ wireless communication device 380 based on the state of the speed frame indicator bits. The state of the speed frame indicator bits may change as the frames are transmitted. In this instance, the 1st wireless communication device 310 determines one or more frames transmitted from the hidden node device (e.g., the $2^{nd}$ wireless communication device 370 or the $3^{rd}$ wireless communication device 380) as well as determines when communications between the $2^{nd}$ wireless communication device 370 and the $3^{rd}$ wireless communication device 380 are completed. With such knowledge of other devices' communications, even when they cannot be directly received, the $1^{st}$ wireless communication device 310 can make transmissions with a high expectation of success.

Figure 4:
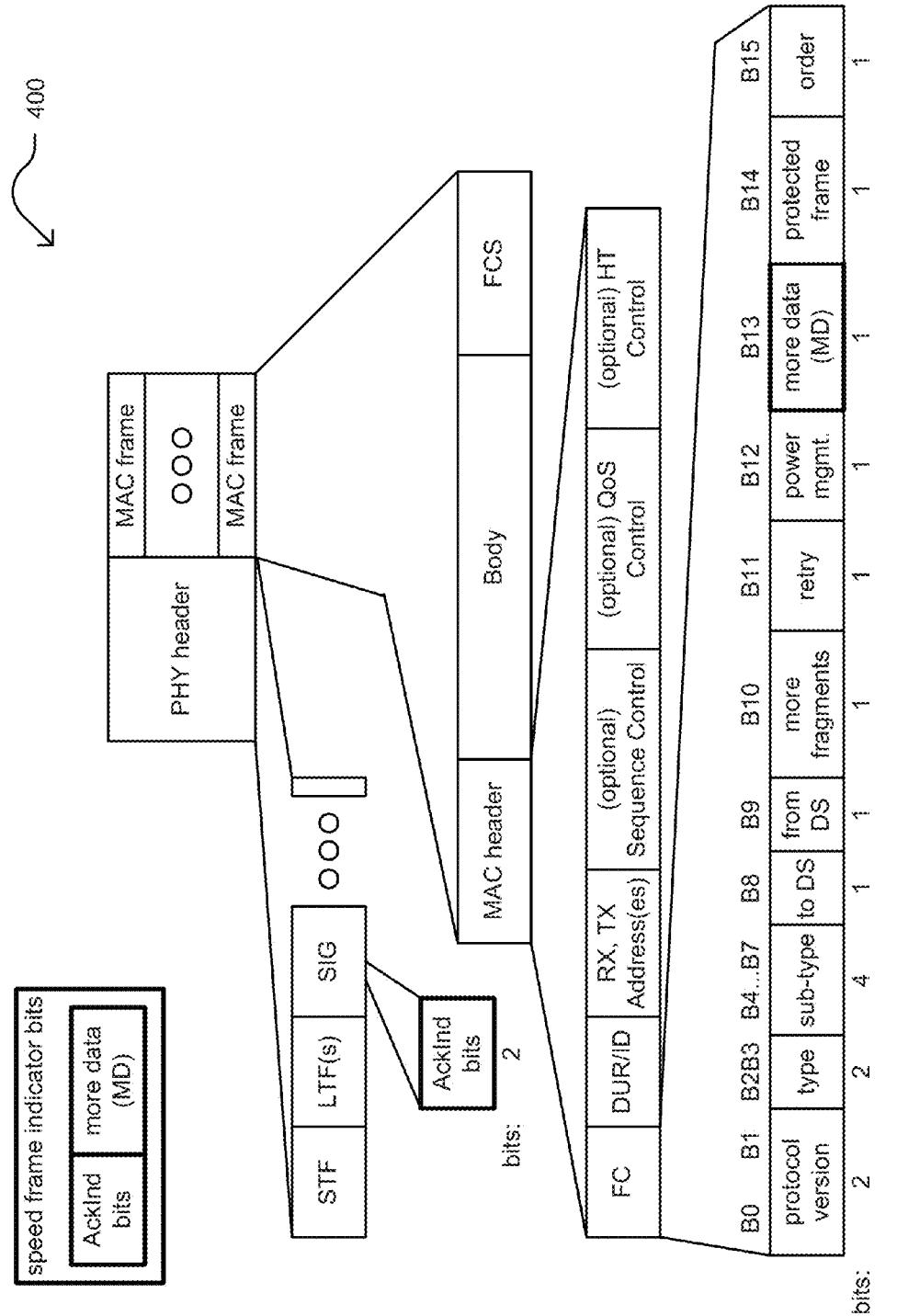
FIG. 4 is a diagram illustrating an example of a frame in accordance with the present disclosure.

FIG. 4 is a diagram illustrating an example 400 of a frame in accordance with the present disclosure. Generally speaking, a frame may be transmitted from one wireless communication device (e.g., device 124 of FIG. 1) to another wireless communication device (e.g., BS or AP 114 of FIG. 1). Such a frame includes a physical layer (PHY) header and one or more media access control (MAC) frames. A PHY header may include a number of respective fields such as one or more short training fields (STFs) and one or more long training fields (LTFs) which may be used for channel characterization and estimation, a signal field (SIG) which may be used for synchronization and other purposes, and the PHY header may also include other respective fields.

The general format of a MAC frame includes the following basic components: media access control (MAC) header, a frame body, and a frame check sequence (FCS). In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a signal and frame structure is illustrative and provided as an example, and alternative embodiments of signal and frame structures may also be employed.

The frame includes speed frame indicator bits partitioned among the PHY header and the MAC header. The SIG within the PHY header includes an acknowledgment indication (AckInd) bit field (e.g., 2 bits), and the FC field of the MAC header includes a more data (MD) field (e.g., 1 bit). These three bits serve as the speed frame indicator bits within the communication protocol presented in this disclosure. A listening wireless communication device is able to detect or hear frames transmitted from only one of two other wireless communication device in communication (e.g., detect frame(s) transmitted by device 124 but unable to detect frame(s) transmitted by BS or AP 114 of FIG. 1).

State of the MD field may be used to indicate uplink data. In certain prior communication protocols, the MD field indicates more downlink data. For example, The MD field indicates buffered data at one wireless communication device (e.g., AP) intended for another wireless communication device (e.g., STA, SMSTA, etc.) in a power save operational mode (in a DATA frame). Alternatively, the MD field indicates the one wireless communication device (e.g., AP) has one or more pending transmissions if an automatic power save delivery (APSD) operative wireless communication device (e.g., APSD-STA) advertises support for MD acknowledgement (in an acknowledgement (ACK) frame). In even another situation, the MD field indicates the TDLS (Tunneled Direct Link Setup) peer wireless communication device (e.g., STA) has pending transmissions. Also, within a group-addressed DATA frame, the MD field indicates more broadcast or multicast frames will be buffered at another wireless communication device (e.g., AP). Also, the MD field may serve another purpose including indication of uplink data.

Various timing diagrams are presented and described below. For illustration, communications are shown as occurring between an access point (AP) and a wireless station (STA). However, such communications may generally be performed between any two wireless communication devices (e.g., AP to AP, STA to STA, STA to AP, AP to STA, SMSTA to AP, AP to SMSTA, etc.). There are a large number of possible frame exchanges that may occur between two respective wireless communication devices, and the following timing diagrams are examples to illustrate the functionality of such a protocol. Any number of variations or alternative frame exchanges may be employed in other implementations, examples, and/or embodiments.

A listening wireless communication device (e.g., another wireless communication device) may determine the communications between the AP and the STA interpreting the one or more frames to determine characteristics of communication between the AP and the STA (even when one of them is a hidden node). For example, consider the STA is a hidden node, then a listening wireless communication device determine when the STA is likely transmitting based on the characteristics of communication transmitted from the AP. The listening wireless communication device then will indicate that a communication channel is unavailable when the STA is likely transmitting and can also indicate that the communication channel is available when neither the STA nor the AP is likely transmitting. FIG. 5 through FIG. 9 show various examples of how a listening wireless communication device is implemented to determine communications between two other wireless communication devices based on analysis of speed frame indicator bits within one or more frames transmitted from only one of the two other wireless communication devices (e.g., only the AP or the STA). In these examples below, the speed frame indicator bits include an acknowledgment indication (AckInd) bit field (e.g., 2 bits) within the SIG within the PHY header's SIG, and the more data (MD) field (e.g., 1 bit) within the MAC header's FC field).

Figure 5:
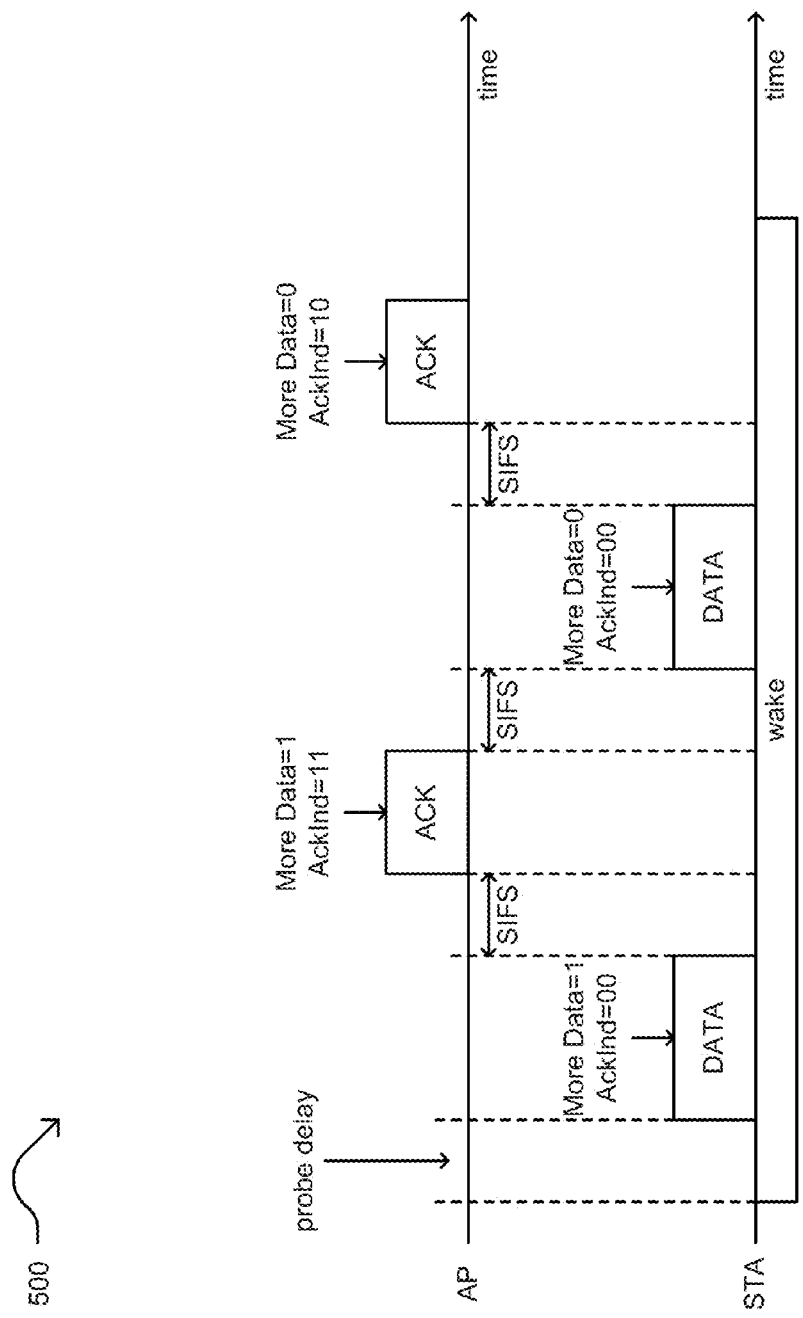
FIG. 5 is a diagram illustrating an example of a timing diagram of communication between two wireless communication devices.

FIG. 5 is a diagram illustrating an example 500 of a timing diagram of communication between two wireless communication devices. In this diagram, a STA awakens from a reduced power state or a sleep state (e.g., at a scheduled wake time) and after a probe delay, transmits data to the AP with the MD bit set to 1 and the AckInd bits set to 00. In this diagram, the STA includes buffered uplink traffic, and starts transmission with uplink data instead of PS-POLL. When this uplink data is transmitted, the STA does not necessarily have information regarding whether or not the AP has data intended for the STA. As such, the AckInd bits set to 00, and a default setting of the AckInd bits to 00 may be made when a given device does not have information regarding status of data within the other device. The MD bit set to 1 to indicate that the STA has additional data to be transmitted to the AP. Also, in this diagram, the MD bit is used to allow the responder (AP) to set the AckInd bits correctly in a subsequent frame.

Then, after a short interframe space (SIFS), the AP transmits an acknowledgment (ACK) to the STA with the MD bit set to 1 and the AckInd bits set to 11. Because of the indication of the MD in the uplink communication, the AP knows that additional data will be transmitted from the STA. The MD bit set to 1 to indicate that the AP will make an additional transmission to the STA, and the AckInd bits set to 11 reserve the communication medium for the next transmission from the STA. That is to say, the AckInd bits set to 11 reserve the communication medium for a period of time to allow the subsequent transmission from the STA to the AP.

Then, after another SIFS, the STA transmits the additional data to the AP with MD bit set to 0 and the AckInd bits set to 00. The MD bit set to 1 to indicate that the STA does not have additional data to be transmitted to the AP. The AckInd bits set to 00 indicate that an ACK is requested from the AP.

Then after another SIFS, the AP transmits another ACK to the STA with the MD bit set to 0 and the AckInd bits set to 10. The MD bit set to 0 to indicate that the AP will not make an additional transmission to the STA, and the AckInd bits set to 10 indicate that no response in needed from the STA. Subsequently, the STA will return to a reduced power or sleep state sends the MD bit was set to 0 in the latest ACK, and the STA will understand that no additional communications will be received from the AP.

Figure 6:
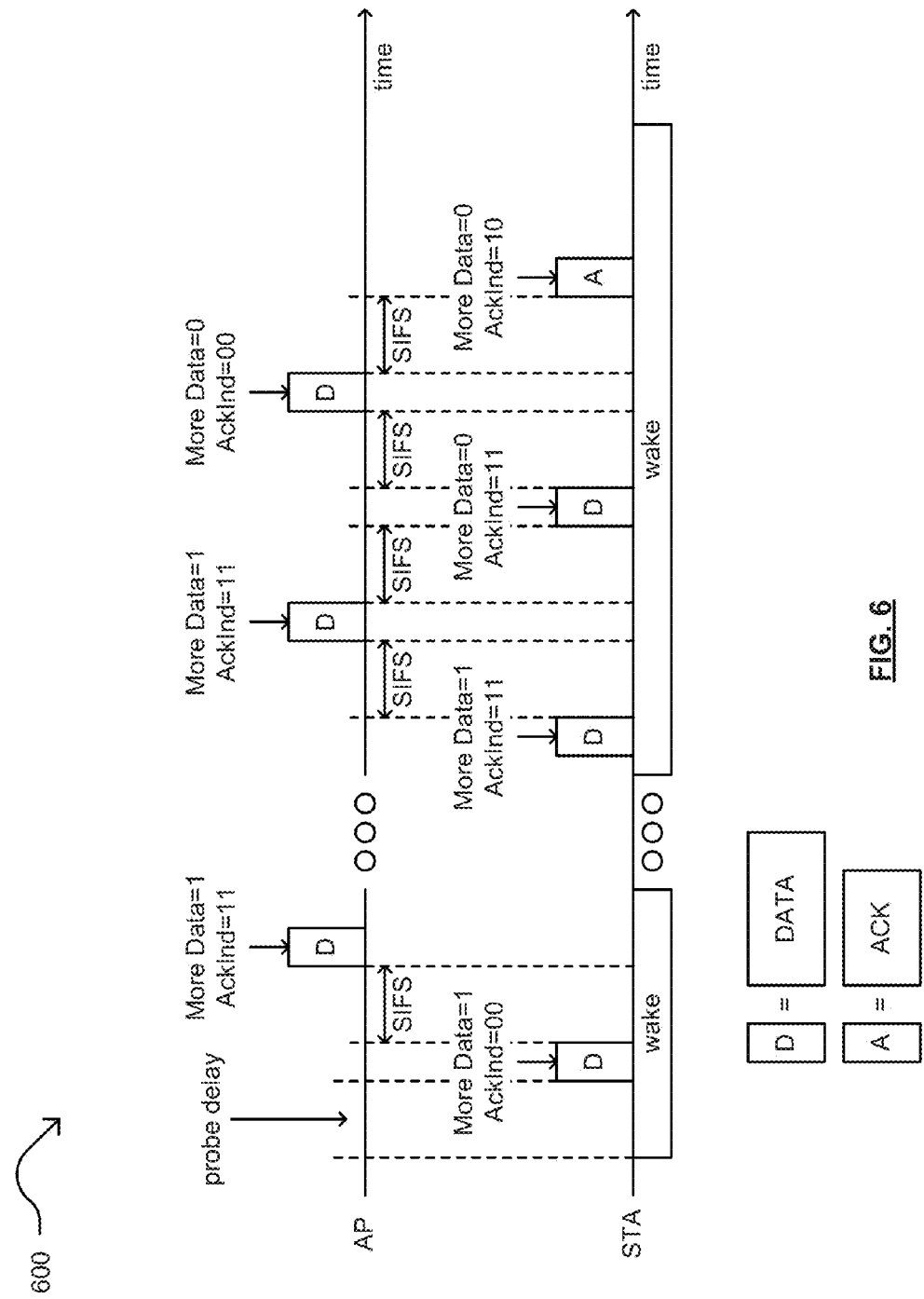
FIG. 6 is a diagram illustrating another example of a timing diagram of communication between two wireless communication devices.

FIG. 6 is a diagram illustrating another example 600 of a timing diagram of communication between two wireless communication devices. In this diagram, both the AP and the STA have an equal number of uplink and downlink data frames to be exchanged. Also, since the AP is aware of the STA's wake time, the AP can prepare downlink data for the STA. As with the prior diagram, the STA starts transmission with uplink data instead of PS-POLL.

After awakening from the reduced power or sleep state, the STA transmits a data frame with the MD bit set to 1 and the AckInd bits set to 00 (e.g., default setting without knowledge of the AP). The MD bit set to 1 to indicate that the STA will make an additional transmission to the AP.

Then, after a SIFS, the AP transmits a data frame with the MD bit set to 1 and the AckInd bits set to 11. The MD bit set to 1 to indicate that the AP will make an additional transmission to the STA, and the AckInd bits set to 11 reserve the communication medium for the next transmission from the STA. Any number of additional data frame exchanges may occur between the STA and the AP.

Continuing on, the AP transmits a data frame with the MD bit set to 1 and the AckInd bits set to 11. The MD bit set to 1 to indicate that the AP will make an additional transmission to the STA, and the AckInd bits set to 11 reserve the communication medium for the next transmission from the AP.

After an SIFS, the AP transmits a data frame with the MD bit set to 1 and the AckInd bits set to 11. The MD bit set to 1 to indicate that the STA will make an additional transmission to the AP, and the AckInd bits set to 11 reserve the communication medium for the next transmission from the AP.

Then, after yet another an SIFS, the STA transmits a data frame with the MD bit set to 0 and the AckInd bits set to 11. This particular transmission may include a block acknowledgement (BlockACK or BA) inside of an aggregated MAC (media access control) data protocol unit (A-MPDU) with DATA. The MD bit set to 0 to indicate that the STA will not make an additional transmission to the AP (e.g., this is the last data frame from the STA), and the AckInd bits set to 11 reserve the communication medium for the next transmission from the AP.

After yet another an SIFS, the AP transmits a data frame with the MD bit set to 0 and the AckInd bits set to 00. The MD bit set to 0 to indicate that the AP will not make an additional transmission to the AP (e.g., this is the last data frame from the AP), and the AckInd bits set to 00 to indicate that an ACK is requested from the STA.

After the final SIFS in this frame exchange, the STA transmits an acknowledgement (ACK) frame with the MD bit set to 0 and the AckInd bits set to 10. The MD bit set to 0 to indicate that the STA will not make an additional transmission to the AP after this ACK, and the AckInd bits set to 10 to indicate that no response in needed from the AP.

Figure 7:
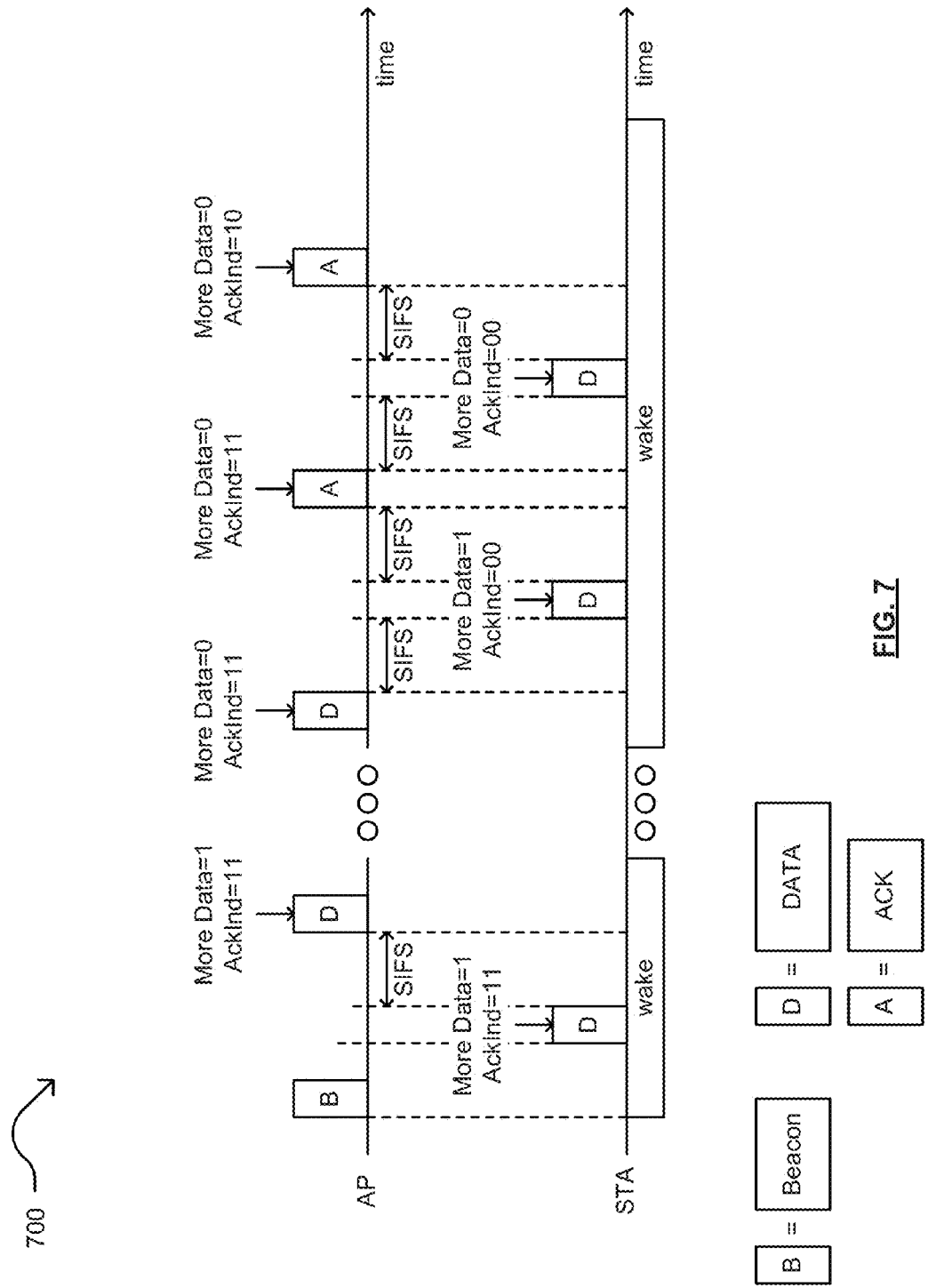
FIG. 7 is a diagram illustrating another example of a timing diagram of communication between two wireless communication devices.

FIG. 7 is a diagram illustrating another example 700 of a timing diagram of communication between two wireless communication devices. The operation of this diagram has some similarities to the previous two diagrams accept that a beacon is transmitted from the AP to the STA after the STA has awakened from a reduced power sleep state. A traffic indication map (TIM) bit within the beacon provides indication that the AP has buffered downlink data intended for the STA. As such, in the first data transmission from the STA to the AP, the STA sets MD bit set to 1 and the AckInd bits set to 11. That is to say, because there's prior knowledge of downlink data buffered at the AP and intended for the STA, the STA sets the AckInd bits to 11.

Then, after a SIFS, the AP transmits a data frame with the MD bit set to 1 and the AckInd bits set to 11. The MD bit set to 1 to indicate that the AP will make an additional transmission to the STA, and the AckInd bits set to 11 reserve the communication medium for the next transmission from the STA. Any number of additional data frame exchanges may occur between the STA and the AP.

Continuing on, the AP transmits a data frame with the MD bit set to 0 and the AckInd bits set to 11. The MD bit set to 1 to indicate that the AP will not make an additional data frame transmission to the STA, and the AckInd bits set to 11 reserve the communication medium for the next transmission from the AP. The AckInd bits set to 00 indicate that an ACK is requested from the AP.

After yet another SIFS, the AP transmits an acknowledgment (ACK) to the STA with the MD bit set to 0 and the AckInd bits set to 11. The MD bit set to 1 to indicate that the AP does not have an additional data for the STA. The AckInd bits set to 11 reserve the communication medium for the next transmission from the STA.

Then, after another SIFS, the STA transmits the additional data to the AP with MD bit set to 0 and the AckInd bits set to 00. The MD bit set to 1 to indicate that the STA does not have additional data to be transmitted to the AP. The AckInd bits set to 00 indicate that an ACK is requested from the AP.

Then after another SIFS, the AP transmits another ACK to the STA with the MD bit set to 0 and the AckInd bits set to 10. The MD bit set to 0 to indicate that the AP will not make an additional transmission to the STA, and the AckInd bits set to 10 indicate that no response in needed from the STA. Subsequently, the STA will return to a reduced power or sleep state sends the MD bit was set to 0 in the latest ACK, and the STA will understand that no additional communications will be received from the AP. The STA may then return to the reduced power or sleep state since the last MD bit from the AP was set to 0.

Figure 8:
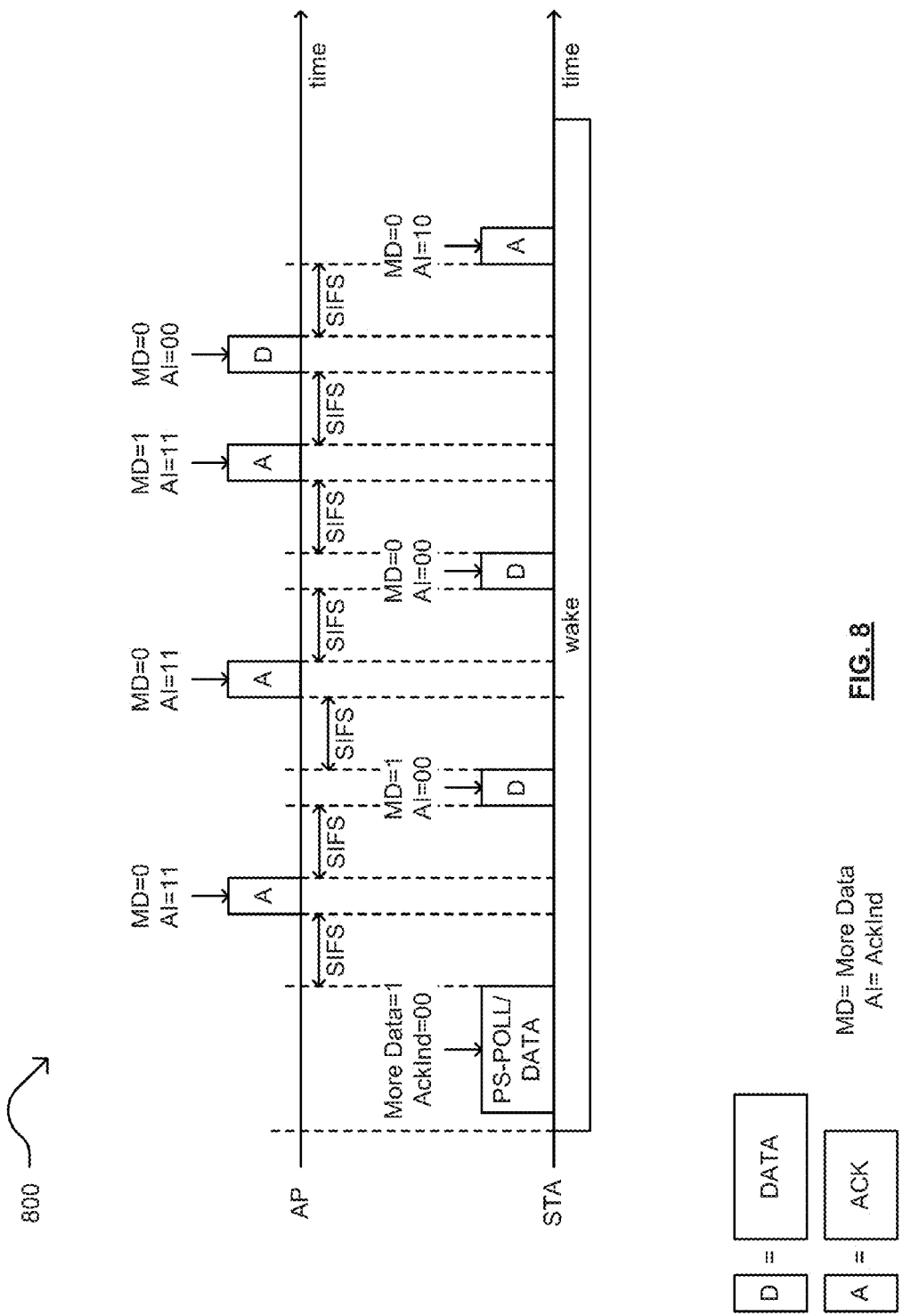
FIG. 8 is a diagram illustrating another example of a timing diagram of communication between two respective wireless communication devices.

FIG. 8 is a diagram illustrating another example 800 of a timing diagram of communication between two respective wireless communication devices. In this diagram, after awakening from a low powered or sleep state, the STA starts transmission with PS-POLL, instead of uplink data, with the MD bit set to 1 (to indicate additional buffered uplink data) and the AckInd bits set to 00.

Then, after SIFS, the AP transmits an acknowledgment (ACK, shown as A in the diagram) to the STA with the MD bit set to 0 (AP does not have an additional data for the STA) and the AckInd bits set to 11 (reserves the communication medium for the next transmission from the STA).

The STA makes a subsequent data transmission, and the AP provides an acknowledgement with the respective MD and AckInd bits set as indicated in the diagram. Then, after another SIFS, the STA transmits additional data to the AP with MD bit set to 0 and the AckInd bits set to 00. The MD bit set to 1 to indicate that the STA does not have additional data to be transmitted to the AP. The AckInd bits set to 00 indicate that an ACK is requested from the AP.

After an SIFS, the AP then transmits an acknowledgment frame to the STA with the MD bit set to 1 and the AckInd bits set to 11. However, in this instance, because the MD bit of the prior data frame received from the STA is 0, the AP may continue to use the transmission opportunity (TXOP) and transmit additional downlink data to the STA. As can be seen, after another SIFS, instead of the AP receiving a frame from the STA, the AP transmits another data frame to the STA with MD bit set to 0 (AP does not have an additional data for the STA) and the AckInd bits set to 00 (an ACK is requested from the STA).

Then, after the final SIFS in this frame exchange, the STA transmits an acknowledgement (ACK) frame with the MD bit set to 0 (STA will not make an additional transmission to the AP after this ACK) and the AckInd bits set to 10 (no response in needed from the AP). The STA may then return to the reduced power or sleep state since the last MD bit from the AP was set to 0.

Figure 9:
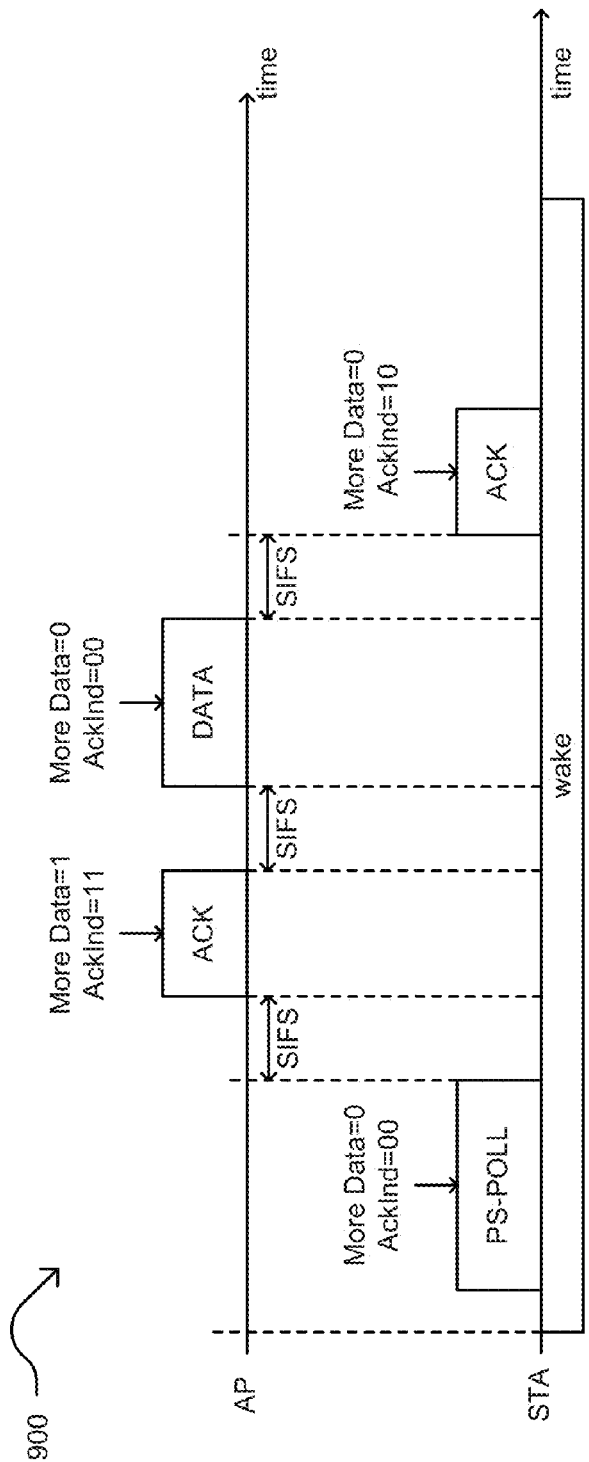
FIG. 9 is a diagram illustrating another example of a timing diagram of communication between two wireless communication devices.

FIG. 9 is a diagram illustrating another example 900 of a timing diagram of communication between two wireless communication devices. This diagram shows the downlink bufferable unit (BU) procedure in the context of fewer frame exchanges. In this diagram, after awakening from a low powered or sleep state, the STA starts transmission with PS-POLL, accompanied with uplink data, with the MD bit set to 0 (to indicate the STA does not have additional buffered uplink data) and the AckInd bits set to 00. After awakening, the STA may wait either for a probe delay or an enhanced distributed channel access (EDCA) delay after an AP-assisted synchronization frame before transmitting the PS-POLL/DATA frame.

After an SIFS, the AP then transmits an acknowledgment frame to the STA with the MD bit set to 1 and the AckInd bits set to 11. However, in this instance, because the MD bit of the prior data frame received from the STA is 0, the AP may continue to use the TXOP and transmit additional downlink data to the STA. As can be seen, after another SIFS, instead of the AP receiving a frame from the STA, the AP transmits another data frame to the STA with MD bit set to 0 (AP does not have an additional data for the STA) and the AckInd bits set to 00 (an ACK is requested from the STA).

Then, after the final SIFS in this frame exchange, the STA transmits an acknowledgement (ACK) frame with the MD bit set to 0 (STA will not make an additional transmission to the AP after this ACK) and the AckInd bits set to 10 (no response in needed from the AP). The STA may then return to the reduced power or sleep state since the last MD bit from the AP was set to 0.

With respect to the PS-Poll for downlink (DL) procedure, for speed frame exchange, when the AP receives a frame from the STA with MD set to 0, and the AP has remaining buffered data for the STA, then, the AP may indicate one of the following based on this downlink bufferable unit (BU) procedure:

1. More Data to 1, acknowledgment indication (AckInd) to 11 in ACK, and the STA shall stay awake for downlink transmissions from $1^{st}$ wireless communication device (e.g., AP) after SIFS.

2. More Data to 1, AckInd to 10 in ACK, and the STA shall stay awake until AP sends downlink transmissions.

3. More Data to 0, AckInd to 10 in ACK, and STA may go back to sleep.

As may be seen, a novel frame exchange approach and associated protocol has been presented that is compatible with existing receive operation for a wireless communication device (e.g., a STA or SMSTA which may operate in a power savings (PS) mode). Also, this protocol is compatible with other frame exchanges which may be used based on communication protocols, standards, and recommended practices. Within such an approach, there are no separate wake times for polling and data delivery exchanges for power conscious wireless communication devices (e.g., STAs). Also, this approach allows for relatively simple wireless communication device implementation and design (e.g., for the AP) since there is no need for separate schedules for polling and DATA transmissions.

There are various embodiments by which the protocol described herein may be implemented. For example, with respect to the assignment of the acknowledgement indicator (AckInd) bits, the various examples provided above are based upon the assignment shown in the table on the lower left portion of FIG. 9. However, alternative assignments may be employed in other embodiments. For example, table on the lower right portion of FIG. 9 may alternatively be used. If desired, even other AckInd bits may be employed to provide effective signaling to other wireless communication devices within a communication system of the frame exchanges being performed between the first and second wireless communication device, even if one of them is a hidden node such that some or all of the transmissions made from the hidden node are not received by a listening device.

Referring to the table on the lower right portion of FIG. 9, it is noted that an NDP Response (AckInd bits set to 01) may be used to represent all null data packet (NDP) frames (including NDP ACK, and NDP BA), and Normal Response (AckInd bits set to 10) may be used to represent both normal ACK and normal BA.

Figure 10:
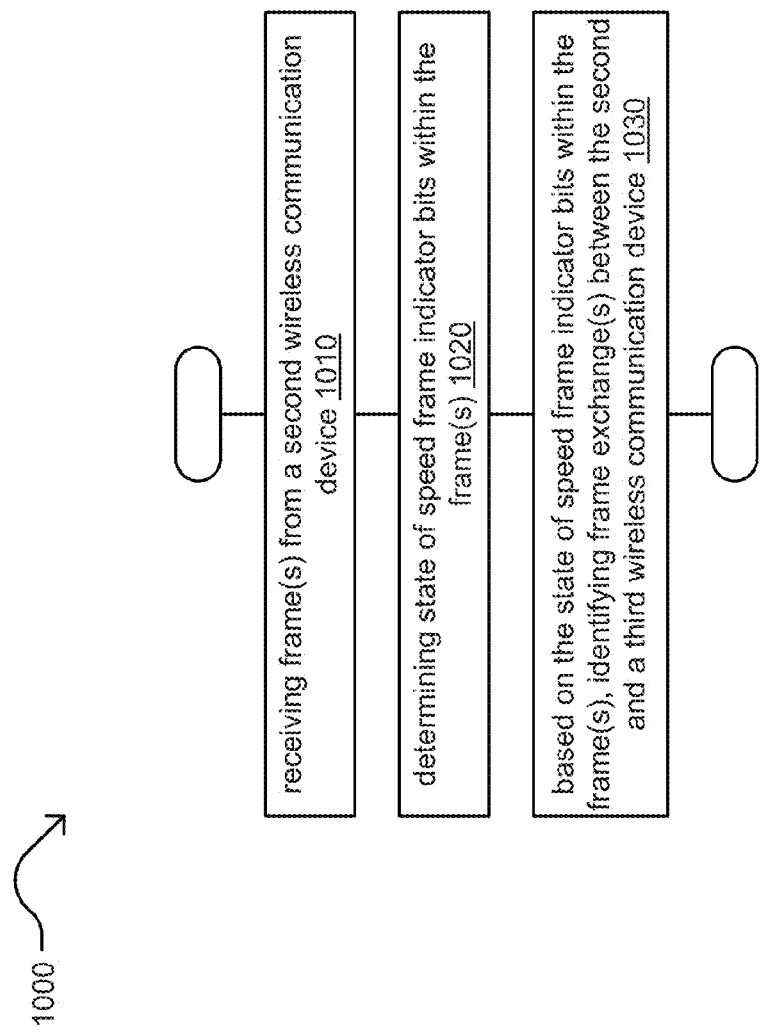
FIG. 10 is a diagram illustrating an embodiment of a method for execution by a first wireless communication device.

FIG. 10 is a diagram illustrating an embodiment of a method 1000 for execution by a first wireless communication device. The method 1000 begins at step 1010 with the first communication device receiving, via a communication interface, one or more frames transmitted from a second wireless communication device. The second wireless communication device is in communication with a third wireless communication device, but the first communication device may not receive at least some of the frames transmitted by the third wireless communication device. In some instances, the first wireless communication device receives none of the frames transmitted from the third communication device. For example, the third wireless communication device may be a hidden node from the perspective of the first wireless communication device.

The method 1000 continues at step 1020 where the first wireless communication device determines state of speed frame indicator bits within the received frames. These frame indicator bits may be partitioned between a packet's physical layer (PHY) header and a media access control (MAC) header such as described with reference to FIG. 4.

The method 1000 continues at step 1030 where the first wireless communication device identifies frame exchanges between the second wireless communication device and the third wireless communication device based on the state of the speed frame indicator bits. Even if a frame transmitted from the third wireless communication device is not received by the first wireless communication device, the first wireless communication device can identify one or more frames exchanged between the second and third wireless communication devices based on state of the speed frame indicator bits within the frames received from the second wireless communication device.

It is noted that the various operations and functions described within various methods herein may be performed within a wireless communication device (e.g., such as by the baseband processing module, processing module, or processor 330 and a communication interface 320 such as described with reference to FIG. 3) and/or other components therein. Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," "processing unit" and/or "processor" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
a processor, at least one of the processor or the communication interface configured to:
detect one or more frames transmitted from a first other wireless communication device and directed to a second other wireless communication device, wherein the second other wireless communication device is out of range of communication with the wireless communication device;
interpret the one or more frames to determine characteristics of communication between the first and the second other wireless communication devices;
determine when the second other wireless communication device is likely transmitting based on the characteristics of communication; and
determine that a communication channel is unavailable when the second other wireless communication device is determined to be likely transmitting.

2. The wireless communication device of claim 1, wherein the characteristics of the communication comprising at least one of:
a single frame exchange between the first and the second other wireless communication devices;
symmetrical multiple frame exchanges between the first and the second other wireless communication devices;
asymmetrical multiple frame exchanges between the first and the second other wireless communication devices;
frame length of the a frame transmitted by the second other wireless communication device;
channel allocation of the communication channel between the first and second other wireless communication devices; or
transmit power of at least one of the first or second other wireless communication devices.

3. The wireless communication device of claim 1, wherein the at least one of the processor or the communication interface is further configured to interpret the one or more frames by interpreting state of speed frame indicator bits within the one or more frames, wherein the state of the speed frame indicator bits indicate at least one of an additional frame to be transmitted, a last frame to be transmitted, a type of frame being transmitted, or reservation of a communication medium for some period of time.

4. The wireless communication device of claim 3, wherein the speed frame indicator bits including one media access control (MAC) header bit and two physical layer (PHY) header bits.

5. The wireless communication device of claim 1, wherein the at least one of the processor or the communication interface is further configured to determine when the second other wireless communication device is likely transmitting by interpreting an acknowledgement indication bit field within the one or more frames transmitted from the first other wireless communication device.

6. The wireless communication device of claim 1, wherein the at least one of the processor or the communication interface is further configured to determine when the first other wireless communication device is likely to transmit at least one additional frame by interpreting a more data bit field within the one or more frames transmitted from the first other wireless communication device.

7. The wireless communication device of claim 1, wherein at least one of the first other wireless communication device or the second other wireless communication device comprising:
   a smart meter station (SMSTA) that operates in sleep state relatively more than in awake state; and
   the SMSTA enters the sleep state after completion of a plurality of frame exchanges.

8. The wireless communication device of claim 1 further comprising:
   at least one of the wireless communication device or the second other wireless communication device including a wireless station (STA) or a smart meter station (SMSTA); and
   the first other wireless communication device including an access point (AP).

9. A wireless communication device comprising:
   a communication interface; and
   a processor, at least one of the processor or the communication interface configured to:
      detect one or more frames transmitted from a first other wireless communication device to a second other wireless communication device; and
      identify frame exchanges between the first other wireless communication device and the second other wireless communication device, wherein the frame exchanges include the one or more frames and at least one frame transmitted from the second other wireless communication device to the first other wireless communication device, and wherein the at least one frame transmitted from the second other wireless communication device is identified based on state of speed frame indicator bits contained in the one or more frames.

10. The wireless communication device of claim 9, wherein the at least one of the processor or the communication interface is further configured to:
   based on the state of the speed frame indicators, determine a type of the at least one frame transmitted from the second other wireless communication device to the first other wireless communication device;
   determining first state of the speed frame indicator bits within a first frame of the plurality of frames; and
   determine second state of the speed frame indicator bits within a second frame of the plurality of frames.

11. The wireless communication device of claim 9, wherein the speed frame indicator bits include one media access control (MAC) header bit, and wherein, within one of the plurality of frames:
   a first state of the one MAC header bit indicates the first other wireless communication device to transmit at least one additional frame to the second other wireless communication device; and
   a second state of the one MAC header bit indicates the one of the plurality of frames is a last frame transmitted from the first other wireless communication device to the other second wireless communication device.

12. The wireless communication device of claim 9, wherein the speed frame indicator bits include two physical layer (PHY) header bits, and wherein, within one of the plurality of frames:
   a first state of the two PHY header bits reserves a communication medium for at least one of the frame exchanges between the first other wireless communication device or the second other wireless communication device; and
   a second state of the two PHY header bits indicates an acknowledgement frame to be received by the first other wireless communication device after transmission of the one of the plurality of frames.

13. The wireless communication device of claim 9 further comprising:
   at least one of the wireless communication device or the second other wireless communication device including a wireless station (STA) or a smart meter station (SMSTA); and
   the first other wireless communication device including an access point (AP).

14. A method for execution by a wireless communication device, the method comprising:
   via a communication interface of the wireless communication device, detecting one or more frames transmitted from a first other wireless communication device to a second other wireless communication device, wherein the second other wireless communication device is out of range of communication with the wireless communication device;
   interpreting the one or more frames to determine characteristics of communication between the first and the second other wireless communication devices;
   determining when the second other wireless communication device is likely transmitting based on the characteristics of communication; and
   determining that a communication channel is unavailable when the second other wireless communication device is likely transmitting.

15. The method of claim 14, wherein the characteristics of the communication comprising at least one of:
   a single frame exchange between the first and the second other wireless communication devices;
   symmetrical multiple frame exchanges between the first and the second other wireless communication devices;
   asymmetrical multiple frame exchanges between the first and the second other wireless communication devices;
   frame length of the a frame transmitted by the second other wireless communication device;
   channel allocation of the communication channel between the first and second other wireless communication devices; or
   transmit power of at least one of the first or second other wireless communication devices.

16. The method of claim 14 further comprising:
   interpreting the one or more frames by interpreting state of speed frame indicator bits within the one or more frames, wherein the state of the speed frame indicator bits indicate at least one of an additional frame to be transmitted, a last frame to be transmitted, a type of frame being transmitted, or reservation of a communication medium for some period of time.

17. The method of claim 16, wherein the speed frame indicator bits including one media access control (MAC) header bit and two physical layer (PHY) header bits.

18. The method of claim 14 further comprising:
  determining when the second other wireless communication device is likely transmitting by interpreting an acknowledgement indication bit field within the one or more frames transmitted from the first other wireless communication device; and
  determining when the first other wireless communication device is likely to transmit at least one additional frame by interpreting a more data bit field within the one or more frames transmitted from the first other wireless communication device.

19. The method of claim 14, wherein at least one of the first other wireless communication device or the second other wireless communication device comprising:
  a smart meter station (SMSTA) configured to operate in sleep state relatively more than in awake state; and
  the SMSTA configured to enter the sleep state after completion of a plurality of frame exchanges.

20. The method of claim 14 further comprising:
  at least one of the wireless communication device or the second other wireless communication device including a wireless station (STA) or a smart meter station (SMSTA); and
  the first other wireless communication device including an access point (AP).

* * * * *